United States Patent Office 3,499,963
Patented Mar. 10, 1970

3,499,963
CODRIED ALUMINUM HYDROXIDE-ALUMINUM CHELATE ANTACID
Andrew M. Rubino, New Providence, N.J., assignor to Armour Pharmaceutical Company, Chicago, Ill., a corporation of Delaware
No Drawing. Filed Apr. 15, 1964, Ser. No. 360,135
Int. Cl. A61k 27/00; C07f 5/06
U.S. Cl. 424—157
20 Claims

ABSTRACT OF THE DISCLOSURE

An antacid composition comprising the codried mixture of an aluminum chelate of an aluminum-chelating water soluble and polyhydric alcohol soluble organic acid selected from the group consisting of alpha hydroxyaliphatic carboxylic acids and beta hydroxyaliphatic carboxylic acids, and of moist aluminum hydroxide gel in a weight ratio $Al(OH)_3$:aluminum chelate within the range from about 0.3:1 to about 1.5:1, and process for making same.

---

This invention relates to an antacid composition and more particularly to a codried combination of an aluminum hydroxy acid chelate salt with aluminum hydroxide and to a proces for preparing the same. The antacids prepared in accordance with this invention have a surprisingly rapid constant, unvarying and sustained buffering action against acids, such as the hydrochloric acid in the digestive system, being capable of maintaining pH within the preferred therapeutic range of from 3 to 5 for at least one hour. In addition, the antacids of this invention combine the economy of the aluminum hydroxide with the added effectiveness of the chelate antacid.

Antacid preparations are now quite generally employed for the treatment of peptic ulcers, gastric hyperacidity and dyspepsia. Gwilt, Livingstone and Robertson in the Journal of Pharmacy and Pharmacology, X, No. 12, 770–775 (1958), describe the characteristics of an ideal antacid. They point out that it should show its maximum neutralizing effect in the shortest possible time, that it should neutralize an adequate amount of gastric hydrochloric acid and maintain its action during the normal period of gastric digestion, that any excess however great beyond the amount required to neutralize free gastric acid should not cause alkalization, that it should raise the pH of the gastric contents to a level at which pepsin activity is reduced significantly but not totally inhibited, that adequate and repeated does should be palatable to the hyperacid patient, and that its use should not lead to constipating or other side effects such as gastic irritation. In addition to these factors, the antacid composition should be inexpensive, and it should not deteriorate significantly in any respect on aging. These workers summarize the various statements in the literature as to the pH ranges desirable for the ideal antacid, and conclude that a pH within the range from about 3 to about 5 is apparently the optimum, to ensure adequate relief from hyperacidity, particularly if an ulcer site is present, and at the same time permit sufficient residual pepsin activity to avoid secondary digestive disturbances.

Edwards in The Chemist and Druggist, Dec. 14, 1957, page 647, also discusses the properties of an ideal antacid, and suggests that the nearest approach to the ideal attained as of that date was wet activated alumina gel. Dr. Edwards' views of the properties of the ideal antacid are in substantial agreement with those expressed by Gwilt et al.

Liquid aluminum hydroxide gel closely approaches the ideal for an antacid, but its liquid form makes it inconvenient to use, especially in the case of ambulatory patients. Also, it is incompatible with therapeutic adjuvants insoluble in or non-dispersible with water. The liquid gel is quite rapid in its action, and gives a prolonged antacid effect in the optimum pH range. It is not significantly affected in its antacid properties by pepsin, and it also does not significantly lose its antacid characteristics on aging. However, as Edwards and others have pointed out, it may have a mildly constipating effect, which many have sought to remedy by combining it with other ingredients such as magnesium hydroxide or carbonate.

The advantages of the dried gel are obvious. However, the obvious material, dried aluminum hydroxide gel, is actually far from an ideal antacid. It exhibits a lag in its rate of reaction with stomach acids. It does not give prolonged antacid activity in the optimum pH range, and its antacid properties are severely affected by pepsin. Also, its antacid activity is less than that of the liquid gel, being decreased by the drying, and the reduced activity decreases further with aging. These disadvantages have been noted by Gwilt et al. and other workers in this field.

A number of combinations incorporating aluminum hydroxide gels have been proposed, in which the antacid activity is enhanced by incorporating therewith another compound, such as magnesium carbonate, magnesium silicate, calcium carbonate, and the like. For example, a further problem often encountered when using the pure aluminum hydroxide gel is the mild constipative effect of the aluminum hydroxide. This may be counteracted by mixing with the aluminum hydroxide a percentage of magnesium hydroxide. The preferred proportions are approximately 5:8 magnesium hydroxide to aluminum hydroxide. The constipative effect of the aluminum is thereby counteracted by the cathartic action of the magnesium compound. All of these compositions suffer from a major drawback inherent in the use of aluminum hydroxide gel, its relative insolubility in the stomach fluids. Antacid action is not demonstrated immediately, but instead there is a certain time interval before a sufficient amount of the antacid composition has been dissolved to affect the pH of the stomach. This drawback prevents such compositions from showing their maximum neutralizing effect in the shortest possible time, although they are quite effective in maintaining an optimum pH over a long period of time. Yet, the aluminum hydroxide is a compartively inexpensive and easily obtainable material and would be most desirable for use, if these problems could be overcome.

Recent discoveries have shown that the chelate of the aluminum hydroxy compound provides a far more effective, albeit more expensive, antacid material. In these chelate antacids, the aluminum is chelated in the anionic part of the molecule, by association with the hydroxy group of an alpha or beta hydroxyaliphatic carboxylic acid. Ordinarily, from one-half to all of the coordination positions of the aluminum atom are taken up by reaction with the acid.

In accordance with this invention, it has been found that codried combinations of the aluminum chelate antacids with aluminum hydroxide $Al(OH)_3$ in a weight ratio $Al(OH)_3$:aluminum chelate within the range from about 0.3:1 to about 1.5:1 have an antacid effectiveness by the Holbert, Noble and Grote test method at least equal to an equivalent weight of pure chelate material, with a considerable saving in cost. This unexpected synergistic interaction between the chelate antacid and aluminum hydroxide is not fully understood by the inventors. However, it is found only in the compositions wherein the components are mixed wet and then codried and is not obtained with merely mixed separately dried components.

The antacids of the invention can be described chemically as an aluminum chelate hydroxide. However, this is not meant to imply that it is a single chemical compound, since the composition and structure are as yet unknown. The aluminum acid chelate and aluminum hydroxide groups may be associated in some form of complex ion or coordination complex, or the product of this invention may be a simple mixture. But, even though free Al(OH)$_3$ is present, the antacid characteristics of the product differ substantially from conventional blends of aluminum hydroxide and aluminum chelates.

These antacids are capable, as determined by the Holbert, Noble and Grote test procedure, of maintaining a pH in the stomach within the range from 3 to 5, and preferably from 3.5 to 4.5, for two hours and longer, and rapidly increase the pH to within this range without exceeding the maximum optimal pH of 5.

The antacid effectiveness of the antacids of the invention is measured by the method of Holbert, Noble and Grote, Journal of the American Pharmaceutical Association, 41, 361 (1952). In this method, a test sample of antacid is added to 150 ml. of pH 1.5 hydrochloric acid containing 2 g. of pepsin N.F. per liter (artificial gastric juice) at 375° C. 20 ml. of the artificial gastric juice is withdrawn every ten minutes, and replaced with an equal volume of fresh gastric juice. The test procedure used in the work reported in the following examples, however, was carried out by continuously introducing fresh artificial gastric juice and removing the antacid gastric juice mixture by overflow at the rate of 2 ml. per minute. The antacid effect is determined by measuring the pH of the artificial gastric juice during the test period, which was two hours (120 minutes).

The antacids of the invention are manufactured by preparation of a slurry of a freshly precipitated moist aluminum hydroxide gel of high antacid activity in an aluminum chelate antacid solution. The resultant slurry is agitated to provide intimate mixing and/or interaction of the components. The slurrying liquid such as water is then removed to provide a gelled or codried composition of aluminum chelate and aluminum hydroxide.

The antacids of this invention are intended to be marketed as dry solids. They can have a weight ratio Al(OH)$_3$:aluminum chelate within the range from about 1:5 to about 5:1 without diluting excessively the antacid effectiveness of the chelate. The upper limit to the proportion of aluminum hydroxide to chelate is not critical. However, too high a ratio will result in an antacid not displaying a rapid pH rise to within the range of 3 to 5; this is undesirable. Preferred relatively high Al(OH)$_3$:aluminum chelate ratios which provide a fast acting antacid are within the range from 1:2.5 to 4:1.

Aluminum chelate compounds of the type useful in these codried combinations are described in copending applications Ser. No. 255,218 filed Jan. 31, 1963, and Ser. No. 236,168 filed Nov. 7, 1962. These are chelates of an aluminum hydroxy compound with a hydroxycarboxylic acid. Aluminum has a coordination number of 4 or 6, usually 6, and will form chelates with various types of organic compounds, such as the alpha and beta hydroxy aliphatic organic acids. Chelates in which the aluminum is fully complexed with the acid are described in British Patent No. 336,922 and Canadian Patent No. 465,269. In such chelate complexes, which are highly water-soluble, only a very small concentration of aluminum ion is supplied to the solution, the chelate being only slightly ionized, and the concentration of aluminum ion is in fact less than is present in the case of aqueous solutions of aluminum hydroxide or aluminum stearate, for example. Aluminum hydroxide is an effective antacid because the concentration of aluminum ion in an antacid can be very low. Because aluminum ion will be released from the chelate as fast as it is removed from the stomach fluids by reaction with the acids thereof, a fully complexed aluminum chelate also is useful as an antacid.

These codried combinations of the invention are superior to aluminum hydroxide gel because of their high solubility, the neutralization reaction in the stomach high solubility, the neutralization reaction in the stomach begins almost immediately, bringing about an almost immediate and significant decrease in the acidity of the stomach. In addition, the antacids impart a sustained antacid effect due to the slow release of an adequate concentration of aluminum ion therefrom. Hence, these compositions serve as a reservoir, supplying aluminum ion as fast as the available aluminum ion is consumed or dissipated by reaction with the stomach fluids. As a result, one dosage unit of the compositions of this invention can be made to continuously supply aluminum ion over a 1½ to 2 hour period or longer as required.

In these chelate compounds, the aluminum is chelated in the anionic part of the molecule by association with the hydroxy group of an alpha or beta hydroxy aliphatic carboxylic acid. All six of the coordination positions of the aluminum can be taken up, but the partially complexed chelates are more effective and are preferred. The pH of the chelate may be varied within a range of about 4 to about 9 by reacting the complexed chelate with a basic salt, oxide or hydroxide of alkali metals, ammonium, alkaline earth metals or bismuth. The resulting metal chelate salt is water soluble. This allows a tailoring of the final product to produce any desired pH within a wide range. It is believed that the metal base reacts with hydroxy hydrogen of the alpha or beta hydroxy group.

The chelate compositions used in this invention are prepared by reacting an aluminum compound with a chelating alpha or beta hydroxy aliphatic carboxylic acid and establishing the pH in the finished product by addition if necessary of a non-toxic alkali metal, ammonium, alkaline earth metal or bismuth hydroxide or basic salt to within the range from about 4 to about 9. Surprisingly, the solubility of these chelate anions is so great that even the usually insoluble alkaline earth metal salts are soluble. If the starting aluminum compound is a strongly basic compound such as an alkali metal aluminate, sufficient alkali metal is generally present in solution so that it may not be necessary to subsequently add additional quantities of a basic compound to a mixture to raise the pH thereof. In some cases, it may even be necessary to add additional acid to lower the pH to the desired level. The alkali metal, ammonium, alkaline earth metal or bismuth salts of these aluminum hydroxy carboxylic acid chelates are believed to correspond to the empirical formula:

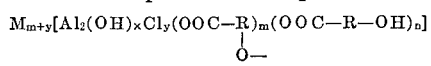

where $y$, $m$, $n$ and $x$ are numbers whose sum is such as to balance the positive valences of the alkali or alkaline earth metal, ammonium or bismuth, M and aluminum, $m+y$ is the total number of gram atoms of the alkali or alkaline earth metal, ammonium or bismuth M, M representing bismuth or a non-toxic alkali metal, ammonium or alkaline earth metal such as magnesium or calcium, and $m+n$ is the total number of gram molecular weights of alpha- or beta-hydroxy aliphatic carboxylic acid. The value of $m$ will ordinarily range from 1 to 3, $n$ from 0 to 3, and $y$ from 0 to 1. It will be understood that $m$ and $n$ represent average numbers and need not be integers.

R is an alkylhydroxyalkyl group, the residue of the hydroxy aliphatic carboxylic acid, wherein at least one hydroxy group is alpha or beta to the carboxylic group, and wherein there can be one or a plurality of hydroxy groups. R has at least one hydroxy group and at least one carboxylic acid group for each one to six carbon atoms.

In the above formula, the alkali or alkaline earth metal, ammonium or bismuth M is cationic, and the remainder of the molecule enclosed within the brackets is anionic. Thus, the aluminum is entirely in the anionic portion of the molecule.

The value of $y$ in the above formula can be varied within the limits indicated. Particularly satisfactory complexes are obtained when the proportion of aluminum to chlorine in the complex is approximately 1.5 to 2.5:1.

It is also possible to formulate complexes in which $y$ is 0, i.e., no chlorine is present. Such complexes are quite satisfactory antacids.

As an example, when the hydroxy carboxylic acid is lactic acid, the formula takes on the specific representation:

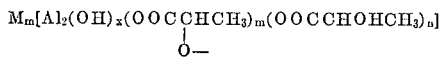

in which $m$, $n$, $x$ and M are the same as above. The total of $m+n$ is within the range of 2 to 4, and $x$ is $6-(m+n)$.

These complexes are water soluble and, in aqueous solution, are in equilibrium with only a very small concentration of aluminum ions. Thus, aluminum is available for antacid activity, which is desirable, but an insufficient amount of aluminum is present to precipitate in the form, for example, of aluminum hydroxide, should there be a sufficient number of hydroxyl ions present to react with the aluminium ions. The amount of aluminum ions in solution is so small that the solubility product of aluminum hydroxide is not exceeded. Indeed, the solubility of the anionic portion including the aluminum ion is so high, that even the alkaline earth metal salt is quite water soluble, corresponding in solubility characteristics to calcium nitrate or calcium chloride, rather than to calcium hydroxide or magnesium hydroxide. Naturally, these properties are quite advantageous in an antacid.

As the hydroxy carboxylic acid, any aliphatic carboxylic acid in which the hydroxyl group is alpha or beta to the carboxylic acid group can be employed. The acid may contain a plurality of hydroxyl groups, provided at least one is in the alpha or beta position, and the acid may also include a plurality of carboxylic acid groups, provided again that at least one hydroxyl group is alpha or beta to at least one of the carboxylic acid groups. Typical hydroxy aliphatic acids that can be employed include lactic acid, glycolic acid, gluconic acid, trihydroxy glutaric acid, citryl trigluconic acid, tartaric acid, malic acid, citric acid, tetrahydroxy adipic acid, and citramalic acid.

It is important to note that the hydroxy carboxylic acid is, in each instance, aluminum chelating and non-toxic under the conditions of use as well as water soluble, and soluble in polyhydric alcohols.

In order to prepare the aluminum chelates of the invention, it is important to react the aluminum compound with the hydroxy carboxylic acid under carefully controlled conditions. As the aluminum compound in preparing a chlorine-free product, an alkali metal aluminate can be employed such as sodium or potassium aluminates, or reactive aluminum hydroxide such as in the form of the gel, either dry or wet. Chlorine-containing aluminum chelates are obtained by reaction of the acid with an aluminum chlorhydroxy complex corresponding to the formula:

$$Al_2(OH)_xCl_y$$

in which the sum of $x$ and $y$ is 6, and $x$ and $y$ are each at least 1.

A proportion of acid is employed to establish the best pH level for the finished antacid product, and is adequate to take up at least 3 up to a total of 6 of the chelating positions of the aluminum, which total 6. The number of positions taken up by one mole of the hydroxy carboxylic acid will depend upon the available chelating groups in the acid. In the case of lactic acid, one mole of the acid will take up 2 coordination positions, to a total of 3 moles per aluminum atom, when all 6 of the coordinating positions of the aluminum atom are taken up. Thus, in the case of lactic acid, from 1.5 to 3 moles of the acid per aluminum atom gives satisfactory results.

For example, 1.5 moles of lactic acid per aluminum atom give the following probable reaction;

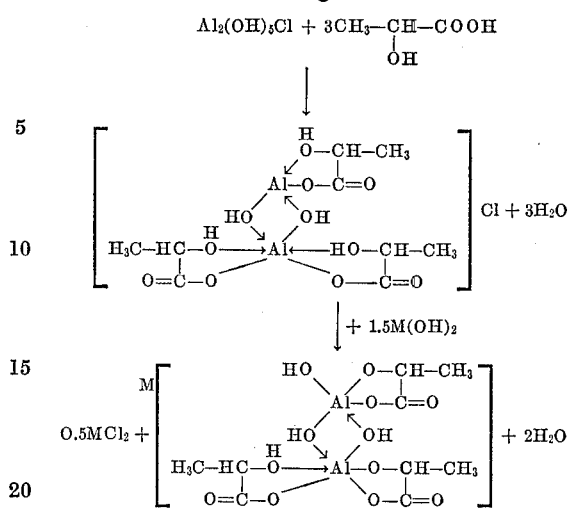

In the case of citric acid, if all three of the carboxylic acid groups and the hydroxyl group react, one mole of the acid will take up four coordination positions of each aluminum atom. However, all of these chelating groups need not react, and in this event a greater amount of the acid could be used without fully coordinating the aluminum. After all of the acid has been chelated with the aluminum, the pH of the composition is adjusted to within the desired range. If the pH is too acid, an alkali or alkaline earth metal, ammonium or bismuth hydroxide or carbonate may be added in the amount required. In some cases, it may be necessary to employ an acid to adjust the pH downwardly. The basic salt or hydroxide reacts with the chelate to form the corresponding chelate salt of the basic reagent added, e.g., the addition of sodium hydroxide to the aluminum hydroxy lactate, above, forms sodium aluminum hydroxy lactate.

The chelating reaction can be carried out in any aqueous or organic non-toxic, non-irritating solution. Ordinarily, water or an aqueous solution of water-miscible organic liquid can be used, such as any of the aliphatic alcohols, ethanol, glycerol and propylene glycol being exemplary. Polyhydric alcohols such as glycerol and propylene glycol can be used also in organic solutions. The medium chosen must be one in which the aluminum chelate is soluble.

It is usually necessary to heat the reaction solution at an elevated temperature within the range from about 45 to about 75° C., to effect the chelation. Elevated temperatures in particular are required, when the aluminum is supplied initially in the form of an aluminum chlorhydroxy complex. The reaction may involve first a decomplexing action on the chlorhydroxy complex, in contact with the chelating acid. The chelating acid obtains access to the aluminum, and the aluminum then undergoes chelation, so as to withdraw aluminum ions from the chlorhydroxy complex into the chelating acid complex.

The heating is continued until chelation is complete. From 2 to 5 hours may be required at temperatures of from 60 to 75° C., and correspondingly longer times at lower temperatures. Completion of reaction may be tested for by adding an ionic precipitant for aluminum, such as ammonia or a soluble stearate soap, to a sample of the chelate-containing solution. If no precipitation of aluminum is obtained after heating the mixture at about 70° C. for about a half hour, chelation is complete.

At the completion of the chelation, the pH of the complex is adjusted to within the range from about 4 to about 9. This makes it possible to adjust the pH in the stomach by an addition of an appropriate amount of the aluminum chelate, to maintain the pH above 3 but below 5 for at least one hour without at the same time causing alkinalosis. pH adjustment is normally accomplished by incorporating a sufficient amount of alkali or alkaline earth metal, ammonium or bismuth hydroxide or basic salt, such as the carbonates, as for example, magnesium hydroxide or carbonate or calcium hydroxide or carbonate. These basic compounds react with the aluminum chelate to form a water-soluble salt. Excessive amounts of alkali metals should be avoided since they are systemic alkalis, and hence more difficult for the body to eliminate when the usefulness of the antacid compound has ended.

The precipitated aluminum hydroxide gel is preferably not dried prior to use, i.e., it should contain a sufficient amount of the original gel water to make it moist, usually at least 50%. The drying of the pure gel will irreversibly reduce its antacid activity. There is no upper limit on water content. An aluminum hydroxide gel of high antacid activity must meet the specifications for aluminum hydroxide gel given by the United States Pharmacopoeia, i.e., the equivalent of 0.5 gram $Al_2O_3$ must neutralize a minimum of 250 ml. $\frac{1}{10}$ N HCl. Examples of such gels are the aluminum hydroxide compressed gels, types F–500, F–1000 and F–2000 manufactured by the Reheis Division of Armour Pharmaceutical Company, Incorporated. Such gels may have up to 90% water, which is taken into account in computing the total liquid content of the slurry, below.

To form the antacid composition of this invention, the state of each ingredient and the order of mixing are not critical, and can be widely varied. A precipitated aluminum hydroxide gel can be added to the solution of the chelate salt.

An aluminum hydroxide wet gel or slurry can be mixed with chelate solution or with dried chelate. This new material can also be made in a one step operation by forming the chelate in situ in the presence of a sufficient excess of the aluminum hydroxide gel to form both chelate and the composition of the invention. A portion of the aluminum hydroxide thereby reacts with the acid to form the chelate, while the remainder forms the hydroxide portion of the chelate hydroxide codried antacid.

The temperature at which the slurry is prepared is not critical. Room temperature may be conveniently employed, and higher temperatures can be used without adverse effect.

The liquid content of the slurry is also not critical, but obviously lower liquid contents favor more economic manufacture of the antacid. Liquid contents of from 65% to 90%, expressed as the weight percent of liquid based on total slurry, have been used to advantage. Higher ratios can as readily be used. Lower ratios can also be used, as limited by the water contents of the starting materials and the necessity for providing proper mixing of the slurry.

The antacid product may contain small amounts of carbonate ion or carbon dioxide usually within the range from about 5% to about 12%. This represents material occluded in the gels in the process of manufacture or material absorbed by the gels in storage, or which may be in the form of a basic carbonate.

The slurry should be mixed until the desired degree of homogeneity is achieved, such that when the material dries the hydroxide and chelate are intimately and uniformly dispersed throughout the solid. Homogeneity is usually obtained in less than ½ hour, depending upon the dynamics of agitation and the degree of dilution. One hour's mixing at room temperature (about 25° C.) ensures homogeneity in nearly every case.

The resulting mixture prepared as above described may be dried by any convenient method known to those skilled in the art, such as, for example, spray drying, tray drying, or vacuum drying. The drying temperature may be in the range of from 30 to 75° C. and preferably 45° C. The ultimate dried composition is in the form of a codried gel containing less than 25% water, which can be reduced to powdered form for convenience of packaging and marketing. The powder may be marketed as such or tabletted, using the customary excipients, for example, a polyol, a sweetener, and a lubricant such as mannitol, dextrose and magnesium stearate.

The following examples illustrate preferred embodiments of the preparation of aluminum chelates for use in antacid compositions of this invention.

EXAMPLE A 100 grams of aluminum hydroxide dried gel (–1000) was dissolved in 356.4 grams of glucono-delta-lactone and 300 grams of deionized water by heating at 70° C. for two hours. At the conclusion of the chelation to form the aluminum hydroxy gluconate, 135.5 grams of magnesium carbonate were added and the solution then heated at 70° C. for six hours. A clear, stable, aqueous solution of magnesium aluminum hydroxy gluconate was obtained, having a pH of 7.3, density 28° Baumé at 28° C., and containing 4.6% $Al_2O_3$, 4.9% MgO, 35.1% gluconic acid. The analysis made of the chelate salt in this and succeeding examples (2 to 7) is based on the effective content of the $Al_2O_3$ and the cation or oxide of the M metal in the chelate solution.

EXAMPLE B

Sodium aluminum chlorhydroxy lactate was prepared by mixing 122 grams of aluminum chlorhydroxide ($Al_2(OH)_5Cl$) 50% aqueous solution with 55 grams of deionized water and 77.5 grams of 80% lactic acid and reacting, with agitation, at 60° C. for 2 hours and thereafter adding 33 grams of 50% sodium hydroxide solution to adjust the pH to 6.5. The resultant solution of sodium aluminum chlorhydroxy lactate contained 10.0% aluminum oxide, 21.6% lactic acid, 3.3% sodium and 3.4% chlorine.

EXAMPLE C 11.3 parts of solid sodium aluminate containing 45% aluminum oxide was dissolved in 100 parts of water and then reacted with 100 parts of an aqueous 13.5% solution of lactic acid. The solution was then heated under reflux for 4 hours, and concentrated by evaporation at a temperature of 70° C. to give a solution of sodium aluminum hydroxy lactate containing 5.6% aluminum oxide.

EXAMPLE D 56 grams of dried aluminum hydroxide gel, U.S.P. (F–1000), was mixed with 200.8 grams of glucono-delta-lactone and 84 grams of deionized water, and heated at 75°, with agitation, for 3.5 hours. The pH of the resulting solution was 2.8. Next, 77.3 grams of a 40% aqueous potassium hydroxide solution were added, and heating and agitation were continued to yield a clear solution of potassium aluminum hydroxy gluconate, having a pH of 7.0 and a density of 33 Baumé at 28° C. This solution contained 7.8% potassium, 5.0% aluminum oxide, and 41.1% gluconic acid.

EXAMPLE E 28.3 grams of aluminum hydroxide dried gel U.S.P., 50% $Al_2O_3$, was reacted with 100.8 grams of glucono-delta-lactone and 42 g. of water for 3.5 hours at 75° C. To the resulting aluminum hydroxy gluconate (8.2% $Al_2O_3$) (100 grams) were added 23.5 grams of magnesium carbonate which was reacted with the solution at 60° C. for 1.5 hours, obtaining a clear, stable solution whose pH was 5.85. 8.5 grams of 40% aqueous potassium hydroxide solution were then added, adjusting the pH to 6.5, and obtaining a clear, stable, aqueous solution of potassium magnesium aluminum hydroxy gluconate containing 0.8% potassium, 4.9% $Al_2O_3$, 3.3% MgO, 38.5% gluconic acid and no chlorine.

EXAMPLE F

Potassium aluminum dihydroxy gluconate was prepared by mixing 70.4 grams of dried aluminum hydroxide gel with 126.5 grams of glucono-delta-lactone and 53 grams of deionized water and heating with agitation at 60° to 70° C. for 5.5 hours. The pH of the resulting solution was 4.5. Thereafter, 50 grams of 40% aqueous potassium hydroxide solution was added, to yield a clear stable solution of potassium aluminum hydroxy gluconate having a pH of 5.75, aluminum oxide content of 7.9%, potassium content of 3.0%, gluconic acid content of 30.9%, aluminum to gluconate ratio 0.99 to 1.00 and a density of 27.5° Baumé at 28° C. Excellent antacid characteristics were observed.

EXAMPLE G

Potassium aluminum hydroxy citrate was prepared by mixing an aqueous solution containing 18.2% potassium aluminate with 95 grams of granular citric acid and heating the mixture with agitation at 60° C. for 0.5 hour. Thereafter, 63 grams of a 50% aqueous potassium hydroxide solution was added, yielding a clear stable solution having a pH of 6.5, an aluminum oxide content of 5.1%, a citric acid content of 27%, and a potassium content of 5%.

EXAMPLE H

Sodium aluminum tartrate was prepared by mixing 207 grams of aluminum hydroxide compressed gel F-1000 with 49 grams of water and 61.9 grams of tartaric acid and reacting at 65° C. for 2 hours. Thereafter, 57.4 grams of aqueous sodium hydroxide was added, yielding a clear, stable aqueous solution of sodium aluminum chlorhydroxy tartrate having a pH of 7.6, an aluminum oxide content of 5.95%, a tartaric acid content of 17.5% and a sodium content of 4.7%.

EXAMPLE I 41.7 grams of aluminum hydroxide dried gel U.S.P., 50% $Al_2O_3$, was reacted with 148 grams of glucono-delta-lactone and 62 g. of deionized water for 3.5 hours at 75° C. To this aluminum hydroxy gluconate solution was added 4.6 grams of freshly prepared bismuth hydroxide (75.8% bismuth) and 10 grams of glucono-delta-lactone, and the resulting solution reacted at 60° C. for four hours. At the end of this time, the pH was adjusted to 7 by addition of 108 grams of 40% aqueous potassium hydroxide. A clear, stable, aqueous solution was obtained, potassium bismuth aluminum hydroxy gluconate, containing 9.1% potassium, 1% bismuth, 5.4% $Al_2O_3$, 45.9% gluconic acid and no chlorine. The antacid effectiveness of this composition was determined, and showed a 10 cc. dose of the composition capable of maintaining the pH within the range from 3 to 5 for over two hours.

EXAMPLE J

Magnesium aluminum hydroxy citrate was prepared by mixing an aqueous solution containing 18.2% magnesium aluminate with 95 grams of granular citric acid and heating the mixture with agitation at 60° C. for 0.5 hour. Thereafter, 44.9 grams of magnesium carbonate was added, yielding a clear stable solution having a pH of 6.5, an aluminum oxide content of 5.0%, a citric acid content of 35% and a magnesium content of 4.9%.

EXAMPLE K 369.5 grams of aluminum hydroxide compressed gel U.S.P. (F-2000, 13.8% $Al_2O_3$) was reacted with 356.4 grams of glucono-delta-lactone at 60–70° C. for five hours. At the conclusion of the chelation to form the aluminum hydroxy gluconate 131 grams of 60% $Mg(OH)_2$ paste was then reacted with this solution at 75–80° C. for 2¾ hours. A clear, stable, aqueous solution was obtained, magnesium aluminum hydroxy di-gluconate, having a pH of 7.3, density 30° Baume at 28° C., and containing 5.6% $Al_2O_3$, 6.6% MgO, and 47.8% gluconic acid.

The following examples illustrate the preferred embodiments of this invention as seen by the applicants. They are not intended in any way to restrict or to limit the invention as claimed but are intended as exemplary only.

EXAMPLE 1

100 grams of aluminum hydroxide compressed gel (F-1000) (Reheis) was reacted with 10 grams of the magnesium aluminum hydroxy digluconate prepared in Example K for one hour at room temperature. The addition of the dried soluble chelate caused the gel to become liquid like a slurry. The slurry was dried at 45° C. in an air circulating oven at maximum air flow for 21 hours. The product was ground through a 0.010 inch herringbone mesh screen on a Mikro sample mill. 33.3 grams of a white free flowing powder was obtained. The resultant powder had the following composition:

| | |
|---|---|
| $Al_2O_3$ (total) _____percent__ | 29 |
| Magnesium aluminum hydroxy digluconate _____do____ | 27 |
| pH (4% powder suspension) _____ | 9.1 |
| Acid consuming capacity: | |
|     Cc./gm. at pH 3.5 _____ | 202 |
|     Cc./gm. at pH 3.9 _____ | 158 |
| Reaction velocity (Reheis) _____ | 1′ 25″ |

The $Al_2O_3$ includes the aluminum present in the chelate.

EXAMPLE 2

200 grams of aluminum hydroxide compressed gel (Type F-1000) (Reheis) was reacted with 30 grams of a 40% solution of sodium aluminum chlorhydroxy lactate (prepared as in Example B) for one hour at room temperature. The slurry formed thereby was then dried at 45° C. in an air circulating oven at maximum air flow for 8 hours. 62½ grams of a white, free flowing powder was obtained and was ground through a 0.010 inch herringbone mesh screen on a Mikro sample mill. This powder analyzed as follows:

| | |
|---|---|
| $Al_2O_3$ (total) _____percent___ | 36 |
| Sodium aluminum chlorhydroxy lactate _____do__ | 19 |
| pH (4% powder suspension) _____ | 8.9 |
| Acid consuming capacity: | |
|     Cc./gm. at pH 3.5 _____ | 217 |
|     Cc./gm. at pH 3.9 _____ | 170 |
| Reaction velocity (Reheis) _____sec__ | 65 |

EXAMPLE 3

200 grams of aluminum hydroxide compressed gel (Type F-1000) was reacted with 30 grams of a 35% solution of the sodium aluminum hydroxy lactate complex formed in Example C, for one hour at room temperature. The slurry formed was then dried at 45° C. in an air circulating oven at maximum air flow for 8 hours. The solid was ground through a 0.010 inch herringbone mesh screen on a Mikro sample mill. The product analyzed:

| | |
|---|---|
| $Al_2O_3$ (total) _____percent__ | 34.5 |
| Sodium aluminum hydroxy lactate _____do__ | 19 |
| pH (4% powder suspension) _____ | 9.2 |
| Acid consuming capacity: | |
|     Cc./gm. at pH 3.5 _____ | 213.5 |
|     Cc./gm. at pH 3.9 _____ | 168.5 |
| Reaction velocity (Reheis) _____sec__ | 51 |

The antacids of Examples 1, 2 and 3 were evaluated by the Holbert Noble and Grote test method. The data taken appear in Table I.

The data show that these antacids are capable of maintaining pH within the optimum range of 3 to 4.5 for up to three hours.

TABLE I.—ANTACID EVALUATION BY HOLBERT, NOBLE AND GROTE MODIFIED METHOD

Two gram dose

| Minutes: | Example 1, pH | Example 2, pH | Example 3, pH |
|---|---|---|---|
| 0 | 1.5 | 1.5 | 1.5 |
| 0.25 | 3.2 | 2.7 | 2.7 |
| 0.5 | 3.6 | 3.15 | 3.2 |
| 1 | 3.85 | 3.55 | 3.6 |
| 2 | 4.0 | 3.8 | 3.9 |
| 3 | 4.1 | 3.9 | 4.05 |
| 4 | 4.1 | 3.95 | 4.1 |
| 5 | 4.1 | 4.0 | 4.15 |
| 6 | 4.1 | 4.0 | 4.2 |
| 7 | 4.15 | 4.0 | 4.2 |
| 8 | 4.15 | 4.05 | 4.2 |
| 9 | 4.15 | 4.05 | 4.5 |
| 10 | 4.2 | 4.05 | 4.2 |
| 20 | 4.15 | 3.95 | 4.2 |
| 30 | 3.95 | 3.9 | 4.01 |
| 40 | 3.9 | 3.9 | 4.5 |
| 50 | 3.85 | 3.85 | 3.90 |
| 60 | | 3.8 | 3.9 |
| 70 | | 3.8 | 3.9 |
| 80 | | 3.75 | 3.85 |
| 90 | | 3.7 | 3.8 |
| 100 | | 3.7 | 3.8 |
| 110 | | 3.65 | 3.75 |
| 120 | | 3.6 | 3.7 |
| 130 | | 3.55 | |
| 140 | | 3.5 | |
| 150 | | 3.45 | |
| 160 | | 3.35 | |
| 170 | | 3.2 | |
| 180 | | 3.05 | |
| 185 | | 3.0 | |

EXAMPLE 4

A chelate salt-hydroxide gel codried mixture is prepared in a one step procedure by mixing 122 gms. of aluminum chlorhydroxide 50% aqueous solution, 200 grams of aluminum hydroxide compressed gel (Type F–1000, Reheis), 55 gms. of deionized water and 77.5 gms of 80% lactic acid, reacting with agitation at 60° C. for 2 hours and thereafter adding 33 grams of 50% sodium hydroxide solution to adjust pH to 8.9. The resultant slurry is dried and ground as in the previous examples.

EXAMPLE 5

200 grams of aluminum hydroxide compressed gel (Type F–1000, Reheis) was reacted with 50 grams of a 22% solution of basic aluminum lactate

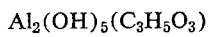

$Al_2(OH)_5(C_3H_5O_3)$ (Reheis, 5% basic aluminum lactate) for one hour at room temperature. A liquid slurry was produced. This slurry was dried at 45° C. in an air circulating oven at maximum air flow for 12 hours. The solid obtained was ground down through a 0.010 inch herringbone mesh screen. 49.5 grams of a white free flowing powder was obtained. The composition of this powder was:

| | |
|---|---|
| $Al_2O_3$ (total) percent | 52 |
| $Al_2(OH)_5(C_3H_5O_3)$ do | 21.8 |
| pH (4% powder suspension) | 8.9 |
| Acid consuming capacity: | |
| Cc./gm. at pH 3.5 | 235 |
| Cc./gm. at pH 3.9 | 170.5 |
| Reaction velocity (Reheis) | 1'54" |

EXAMPLE 6

200 grams of aluminum hydroxide compressed gel (F–2000, Reheis) was reacted with 30 grams of a 40% solution of sodium aluminum chlorhydroxy lactate complex (formed in Example B) for one hour at room temperature. The resultant slurry was dried at 45° C. in an air circulating oven at maximum air flow for 13 hours. The solid was ground through a 0.010 inch herringbone mesh screen to produce 59 grams of a white free flowing powder. The composition of the resultant powder was:

| | |
|---|---|
| $Al_2O_3$ (total) percent | 50 |
| Sodium aluminum hydroxy lactate do | 20 |
| pH (4% $Al_2O_3$ suspension) | 8.6 |
| Acid consuming capacity: | |
| Cc./gm. at pH 3.5 | 133.0 |
| Cc./gm. at pH 3.9 | 93.6 |
| Reaction velocity (Reheis) min | 10 |

The antacids of Examples 5 and 6 were evaluated by the Holbert, Noble and Grote test method. The data taken appear in Table II.

The data show that these antacids are capable of maintaining pH within the optimum range of 3 to 4.5 for up to three hours.

TABLE II.—ANTACID EVALUATION BY HOLBERT, NOBLE AND GROTE MODIFIED METHOD

Two gram dose

| Minutes: | Example 5, pH | Example 6, pH |
|---|---|---|
| 0 | 1.5 | 1.5 |
| 0.25 | 2.3 | 2.75 |
| 0.5 | 2.7 | 2.8 |
| 1 | 3.15 | 2.95 |
| 2 | 3.65 | 3.15 |
| 3 | 3.8 | 3.3 |
| 4 | 3.9 | 3.4 |
| 5 | 3.9 | 3.5 |
| 6 | 3.95 | 3.55 |
| 7 | 3.95 | 3.6 |
| 8 | 3.95 | 3.7 |
| 9 | 3.95 | 3.7 |
| 10 | 3.95 | 3.75 |
| 20 | 3.9 | 3.75 |
| 30 | 3.9 | 3.7 |
| 40 | 3.9 | 3.6 |
| 50 | 3.9 | 3.45 |
| 60 | 3.85 | 3.3 |
| 70 | 3.85 | 3.1 |
| 80 | 3.8 | 2.95 |
| 90 | 3.8 | 2.8 |
| 100 | 3.8 | 2.65 |
| 110 | 3.75 | 2.55 |
| 120 | 3.7 | 2.55 |
| 130 | 3.7 | |
| 140 | 3.65 | |
| 150 | 3.6 | |
| 160 | 3.5 | |
| 170 | 3.35 | |
| 180 | 3.15 | |
| 190 | 2.9 | |
| 200 | 2.7 | |
| 210 | 2.5 | |

EXAMPLE 7

200 grams of aluminum hydroxide compressed gel (F–500, Reheis) was reacted with 30 grams of a 35% solution of sodium aluminum hydroxy lactate, formed in Example C, for one hour at room temperature. The resultant slurry was then dried in an air circulating oven at maximum air flow for 13 hours and ground as in Example 5 to produce 53½ grams of a white free flowing powder having the following composition:

| | |
|---|---|
| $Al_2O_3$ (total) percent | 39 |
| Sodium aluminum hydroxy lactate do | 22 |
| pH (4% powder suspension) do | 8.4 |
| Acid consuming capacity: | |
| Cc./gr. at pH 3.5 | 206.5 |
| Cc./gm. at pH 3.9 | 186.5 |
| Reaction velocity (Reheis) | 1'30" |

EXAMPLE 8

200 grams of aluminum hydroxide compressed gel (Type F–500, Reheis) was reacted with 21 grams of a 48% solution of magnesium aluminum hydroxy gluconate formed in Example A, for one hour at room temperature. The resultant slurry was dried at 45° C. in an air circulating oven at maximum air flow for 11 hours and ground as above to produce 51 grams of a white free flowing powder. The powder had the following composition:

| | | |
|---|---|---|
| $Al_2O_3$ (total) | percent | 38 |
| $Mg_3Al_2(C_6H_{10}O_7)_6$ | do | 19 |
| pH (4% powder suspension) | do | 8.2 |
| Acid consuming capacity: | | |
| Cc./gm. at pH 3.5 | | 223.0 |
| Cc./gm. at pH 3.9 | | 175.0 |
| Reaction velocity (Reheis) | | 1′55″ |

EXAMPLE 9

200 grams of aluminum hydroxide compressed gel (Type F–1000, Reheis) was reacted with 20 grams of a 52% solution of potassium aluminum hydroxy gluconate (formed in Example D) for one hour at room temperature. The resultant slurry was dried at 45° C. in an air circulating oven at maximum air flow for 7.3 hours and ground as above to produce 58 grams of a white free flowing powder having the following composition:

| | | |
|---|---|---|
| $Al_2O_3$ (total) | percent | 36 |
| $K_2[Al(OH)(C_6H_{10}O_7)_2]$ | do | 18 |
| pH (4% powder suspension | do | 9.0 |
| Acid consuming capacity: | | |
| CCk/gr. at pH 3.5 | | 223.0 |
| Cc./gm. at pH 3.9 | | 175.5 |
| Reaction velocity (Reheis) | | 1′15″ |

The results of the Antacid Evaluation tests of the products of Examples 7, 8 and 9 are given in Table III.

TABLE III.—ANTACID EVALUATION BY HOLBERT, NOBLE AND GROTE MODIFIED METHOD

Two gram dose

| Minutes: | Example 7, pH | Example 8, pH | Example 9, pH |
|---|---|---|---|
| 0 | 1.5 | 1.5 | 1.5 |
| 0.25 | 2.95 | 2.7 | 2.8 |
| 0.5 | 3.3 | 2.9 | 3.1 |
| 1 | 3.6 | 3.1 | 3.4 |
| 2 | 3.85 | 3.4 | 3.7 |
| 3 | 4.0 | 3.6 | 3.8 |
| 4 | 4.1 | 3.75 | 3.9 |
| 5 | 4.1 | 3.85 | 3.9 |
| 6 | 4.15 | 3.9 | 3.95 |
| 7 | 4.15 | 3.95 | 4.0 |
| 8 | 4.2 | 4.0 | 4.0 |
| 9 | 4.2 | 4.0 | 4.0 |
| 10 | 4.2 | 4.0 | 4.0 |
| 20 | 4.2 | 4.0 | 3.95 |
| 30 | 4.15 | 4.0 | 3.9 |
| 40 | 4.1 | 4.0 | 3.85 |
| 50 | 4.1 | 3.95 | 3.8 |
| 60 | 4.1 | 3.9 | 3.75 |
| 70 | 4.05 | 3.9 | 3.7 |
| 80 | 4.05 | 3.9 | 3.7 |
| 90 | 4.0 | 3.85 | 3.65 |
| 100 | 4.0 | 3.85 | 3.6 |
| 110 | 4.0 | 3.8 | 3.55 |
| 120 | 3.95 | 3.75 | 3.5 |

The data of Table III show that these antacids are capable of maintaining pH within the range from 3 to 4.5 for over two hours.

EXAMPLE 10

200 grams of aluminum hydroxide compressed gel (Type F–1000, Reheis) was reacted with 20 grams of 50% solution of potassium bismuth aluminum hydroxy gluconate (formed in Example I) for one hour at room temperature. The resultant slurry was dried at 45° C. in an air circulating oven at maximum air flow for 7.3 hours and ground as above to produce 52 grams of a white free flowing powder having the following analysis:

| | | |
|---|---|---|
| $Al_2O_3$ (total) | percent | 36 |
| $KBi[Al(OH)(C_6H_{10}O_7)_2]$ | do | 19 |
| pH (4% powder suspension) | do | 9.0 |
| Acid consuming capacity: | | |
| Cc./gm. at pH 3.5 | | 217.0 |
| Cc./gm. at pH 3.9 | | 187.0 |
| Reaction velocity (Reheis) | sec | 45 |

The results of the Antacid Evaluation test for Example 10 are given in Table IV.

The data of Table IV show that this antacid is capable of maintaining pH within the range from 3 to 4.5 for over two hours.

TABLE IV

Antacid Evaluation by Holbert, Noble and Grote Modified Method.—Two gram dose

| Minutes: | Example 10, pH |
|---|---|
| 0 | 1.5 |
| 0.25 | 2.9 |
| 0.5 | 3.3 |
| 1 | 3.6 |
| 2 | 3.9 |
| 3 | 4.0 |
| 4 | 4.05 |
| 5 | 4.1 |
| 6 | 4.1 |
| 7 | 4.1 |
| 8 | 4.1 |
| 9 | 4.1 |
| 10 | 4.1 |
| 20 | 4.05 |
| 30 | 4.0 |
| 40 | 3.95 |
| 50 | 3.9 |
| 60 | 3.9 |
| 70 | 3.85 |
| 80 | 3.8 |
| 90 | 3.8 |
| 100 | 3.75 |
| 110 | 3.7 |

EXAMPLE 11

200 grams of aluminum hydroxide compressed gel (Type F–1000, Reheis) was reacted with 15 grams of a 50% solution of aluminum dihydroxy gluconate (formed in Example A before the addition of the magnesium carbonate) for one hour at room temperature. The slurry produced was then dried at 45° C. in an air circulating oven at maximum air flow for 5.75 hours and ground as above to produce 58 grams of a white free flowing powder having the following analysis:

| | | |
|---|---|---|
| $Al_2O_3$ (total) | percent | 38 |
| $Al(OH)_2(C_6H_{11}O_7)$ | do | 13 |
| pH (4% powder suspension) | | 9.1 |
| Acid consuming capacity: | | |
| Cc./gm. at pH 3.5 | | 221.8 |
| Cc./gm. at pH 3.9 | | 187.0 |
| Reaction velocity (Reheis) | | 1′30″ |

EXAMPLE 12

200 grams of a aluminum hydroxide compressed gel (Type F–1000, Reheis) was reacted with 45.5 grams of a 22% solution of potassium aluminum hydroxy citrate (produced in Example G) for one hour at room temperature. The resultant slurry was dried at 45° C. in an air circulating oven at maximum flow for 12.5 hours to produce 54 grams of a white free flowing powder having the following analysis:

| | | |
|---|---|---|
| $Al_2O_3$ (total) | percent | 40 |
| Potassium aluminum citrate | do | 18 |
| pH (4% powder suspension) | | 8.9 |
| Acid consuming capacity: | | |
| Cc./gm. at pH 3.5 | | 189.5 |
| Cc./gm. at pH 3.9 | | 153 |
| Reaction velocity (Reheis) | | 3′30″ |

EXAMPLE 13

200 grams of aluminum hydroxide compressed gel (Type F–1000, Reheis) was reacted with 20 grams of magnesium aluminum hydroxy citrate solid (formed by drying the chelate solution formed in Example J) for one hour at room temperature. The resultant slurry was dried at 45° C. in an air circulating oven at maximum air flow for 21.75 hours and ground as above to produce 62 grams of a white free flowing powder having the following analysis:

| | |
|---|---|
| Al₂O₃ (total)percent | 37 |
| Magnesium aluminum citratedo | 31 |
| pH (4% powder suspension) | 8.5 |
| Acid consuming capacity: | |
| Cc./gm. at pH 3.5 | 182 |
| Cc./gm. at pH 3.9 | 162 |
| Reaction velocity (Reheis) | 3' 46" |

The results of the Antacid Evaluation Tests on the products of Examples 11, 12 and 13 are given in Table V.

The data show these antacids capable of maintaining pH within the range from 3 to 4.5 for over two hours.

TABLE V.—ANTACID EVALUATION BY HOLBERT, NOBLE AND GROTE MODIFIED METHOD

Two gram dose

| Minutes: | Example 11, pH | Example 12, pH | Example 13, pH |
|---|---|---|---|
| 0 | 1.5 | 1.5 | 1.5 |
| 0.25 | 2.4 | 2.5 | 2.95 |
| 0.5 | 2.65 | 2.95 | 3.2 |
| 1 | 3.0 | 3.2 | 3.4 |
| 2 | 3.5 | 3.5 | 3.7 |
| 3 | 3.8 | 3.7 | 3.85 |
| 4 | 3.9 | 3.75 | 3.95 |
| 5 | 3.95 | 3.8 | 4.0 |
| 6 | 3.95 | 3.8 | 4.0 |
| 7 | 3.95 | 3.8 | 4.05 |
| 8 | 4.0 | 3.8 | 4.05 |
| 9 | 4.0 | 3.8 | 4.05 |
| 10 | 4.0 | 3.8 | 4.1 |
| 20 | 3.9 | 3.75 | 3.9 |
| 30 | 3.9 | 3.7 | 3.8 |
| 40 | 3.9 | 3.6 | 3.7 |
| 50 | 3.8 | 3.55 | 3.6 |
| 60 | 3.8 | 3.5 | 3.55 |
| 70 | 3.8 | 3.5 | 3.5 |
| 80 | 3.75 | 3.45 | 3.45 |
| 90 | 3.7 | 3.4 | 3.4 |
| 100 | 3.7 | 3.35 | 3.3 |
| 110 | 3.65 | 3.3 | 3.25 |
| 120 | 3.6 | 3.25 | |

EXAMPLE 14

200 grams of aluminum hydroxide compressed gel (Type F-500, Reheis) was reacted with 35 grams of a 34% solution of sodium aluminum hydroxy tartrate (formed in Example H) for one hour at room temperature. The resultant slurry was then dried at 45° C. in an air circulating oven at maximum air flow for 17 hours and ground as above to produce 55 grams of a white free flowing powder having the following analysis:

| | |
|---|---|
| Al₂O₂ (total)percent | 36 |
| Sodium aluminum hydroxy tartratedo | 21 |
| pH (4% powder suspension) | 9.1 |
| Acid consuming capacity: | |
| Cc./gm. at pH 3.5 | 182.0 |
| Cc./gm. at pH 3.9 | 148.2 |
| Reaction velocity (Reheis) | 2' 10" |

The results of the Antacid Evaluation tests on the products of Example 14 are given in Table VI.

The data shown this antacid to be capable of maintaining pH within the range from 3 to 4.5 for over two hours.

TABLE VI

Antacid Evaluation by Holbert, Noble and Grote Modified Method.—Two gram dose

| Minutes | Example 14, pH |
|---|---|
| 0 | 1.5 |
| 0.25 | 3.3 |
| 0.5 | 3.6 |
| 1 | 3.8 |
| 2 | 3.9 |
| 3 | 3.95 |
| 4 | 4.0 |
| 5 | 4.05 |
| 6 | 4.05 |
| 7 | 4.1 |
| 8 | 4.1 |
| 9 | 4.15 |
| 10 | 4.15 |
| 20 | 3.85 |
| 30 | 3.7 |
| 40 | 3.6 |
| 50 | 3.55 |
| 60 | 3.5 |
| 70 | 3.45 |
| 80 | 3.45 |
| 90 | 3.4 |
| 100 | 3.4 |
| 110 | 3.35 |
| 120 | 3.3 |

As is obvious from Tables I through VI, the codried materials of this invention are highly effective antacids. They react quickly in raising the pH of the synthetic gastric juices to above 3 in about 30 seconds and have a high buffering capacity keeping the pH above 3 for at least two hours and in some cases for over three hours. The effectiveness of this codried product thus is equivalent to the pure chelate antacid. By replacing approximately one-third to one-half of the required chelate material by aluminum hydroxide, it its possible through co-drying to reduce the cost of the product quite considerably, without any loss of effectiveness.

The reason for this synergistic activity is not obvious to the applicants. However, a test was made to determine whether samples of dry mixed products of aluminum hydroxide of the type used in the formation of the co-dried product with the above chelates would show the same effect.

EXAMPLE 15

Equivalent proportions of the reactants used in Examples 1 and 2 were dried and intimately mixed in the dried condition. Antacid evaluations using the Holbert, Noble and Grote Modified Method were made on these resultant mixtures. Table VII shows a comparison of the antacid effectiveness of these dry-mixed mixtures (15 A and 15B) with similar dosages of the codried aluminum hydroxide-chelate compositions of Examples 1 and 2.

TABLE VII

| Examples | pH | | | |
|---|---|---|---|---|
| | 15A | 1 | 15B | 2 |
| Time: | | | | |
| 0 | 1.5 | 1.5 | 1.5 | 1.5 |
| 0.25 | 2.25 | 3.2 | 2.7 | 2.7 |
| 0.5 | 2.4 | 3.6 | 2.8 | 3.15 |
| 1 | 2.5 | 3.85 | 2.85 | 3.55 |
| 2 | 2.65 | 4.0 | 2.9 | 3.8 |
| 3 | 2.7 | 4.1 | 2.95 | 3.9 |
| 4 | 2.75 | 4.1 | 3.0 | 3.95 |
| 5 | 2.75 | 4.1 | 3.0 | 4.0 |
| 6 | 2.8 | 4.1 | 3.05 | 4.0 |
| 7 | 2.85 | 4.15 | 3.05 | 4.0 |
| 8 | 2.85 | 4.15 | 3.1 | 4.05 |
| 9 | 2.9 | 4.15 | 3.1 | 4.05 |
| 10 | 2.9 | 4.2 | 3.1 | 4.05 |
| 20 | 2.8 | 4.15 | 3.05 | 3.95 |
| 30 | 2.7 | 3.95 | 2.95 | 3.9 |
| 40 | 2.6 | 3.9 | 2.95 | 3.9 |
| 50 | 2.5 | 3.85 | 2.8 | 3.85 |
| 60 | | | 2.8 | 3.8 |
| 70 | | | 2.75 | 3.8 |
| 80 | | | 2.7 | 3.75 |
| 90 | | | 2.65 | 3.7 |
| 100 | | | 2.55 | 3.7 |
| 110 | | | 2.5 | 3.65 |
| 120 | | | | 3.6 |

It is quite obvious that this synergistic effect is not found by merely mixing the dried compounds together but is the result of an interaction between the chelate and the gel in the wet condition as set forth in Examples 1 through 14.

Moist aluminum hydroxide during drying tends to degrade to the anhydrous form. In combination with the chelate, this degradation of the aluminum hydroxide does not take place. Furthermore, the codried mixture is superior to dried aluminum hydroxide gel in stability on ageing. This tends to support the interaction of the chelate and aulminum hydroxide, since it suggests the aluminum hydroxide is not present in the usual dried form.

I claim:

1. An antacid composition capable as determined by the Holbert, Noble and Grote test method of maintaining the pH of artificial gastric juice within the range from about 3 to about 5 for at least one hour comprising the codried mixture of an aluminum chelate of an aluminum-chelating, water soluble and polyhydride alcohol soluble non-toxic organic acid selected from the group consisting of alpha hydroxy aliphatic carboxylic acids and beta hydroxy aliphatic carboxylic acids, the chelate in aqueous solution having a pH within the range from about 4 to about 9, and corresponding in composition to the empirical formula:

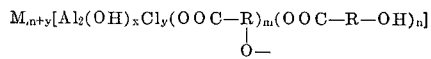

where $y$, $m$, $n$ and $x$ are numbers whose sum balances the positive valences of the cation M and aluminum, $m+y$ represents the total number of gram atoms of the cation M, $m+n$ represents the total number of gram molecular weights of the hydroxy aliphatic carboxylic acid, $m$ is within the range from 1 to 3, $n$ is within the range from 0 to 2, $y$ is within the range from 0 to 1, M represents a cation selected from the group consisting of alkali metals, ammonium, alkaline earth metals and bismuth and the sum of $m+n$ is from 2 to 4, and R represents the residue of the hydroxy aliphatic carboxylic acid and has at least one hydroxy group and at least one carboxylic acid group for each one to six carbon atoms, and moist aluminum hydroxide gel in a weight ratio $Al(OH)_3$: aluminum chelate within the range from about 1:4 to about 5:1.

2. The antacid composition in accordance with claim 1 in which the metal cation is an alkali metal.

3. The antacid composition in accordance with claim 2 in which the alkali metal is sodium.

4. The antacid composition in accordance with claim 2 in which the alkali metal is potassium.

5. An antacid composition in accordance with claim 1 in which the metal cation is an alkaline earth metal.

6. The antacid composition of claim 5 in which the alkaline earth metal is magnesium.

7. The antacid composition of claim 5 in which the alkaline earth metal is calcium.

8. The antacid composition in accordance with claim 1 in which the metal cation is bismuth.

9. An antacid composition in accordance with claim 5 wherein the alkaline earth metal is a mixture of magnesium and calcium.

10. The antacid composition in accordance with claim 1 in which the hydroxy aliphatic carboxylic acid is lactic acid.

11. The antacid composition of claim 1 wherein the hydroxy aliphatic carboxylic acid is maleic acid.

12. The antacid composition in accordance with claim 1 wherein the hydroxy aliphatic carboxylic acid is citric acid.

13. The antacid composition in accordance with claim 1 wherein the hydroxy aliphatic carboxylic acid is gluconic acid.

14. An antacid composition in accordance with claim 1 wherein the proportion of aluminum hydroxide to aluminum chelate is in the range of from 1:2 to 4:1.

15. A process for preparing an antacid composition capable as determined by the Holbert, Noble and Grote test method of maintaining the pH of artificial gastric juice within the range from 3 to about 5 for at least one hour, which comprises preparing an aqueous slurry of a freshly precipitated hydrous gelatinuous aluminum hydroxide and an aluminum chelate of an aluminum-chelating, water soluble and polyhydric alcohol soluble non-toxic organic acid selected from the group consisting of alpha hydroxy aliphatic carboxylic acids and beta hydroxy aliphatic carboxylic acids, the chelate in aqueous solution having a pH within the range from about 4 to about 9, and corresponding in composition to the empirical formula:

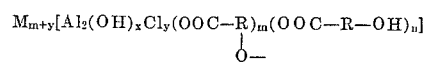

where $y$, $m$, $n$ and $x$ are numbers whose sum balances the positive valences of the cation M and aluminum, $m+y$ represents the total number of gram atoms of the cation M, $m+n$ represents the total number of gram molecular weights of the hydroxy aliphatic carboxylic acid, $m$ is within the range from 1 to 3, $n$ is within the range from 0 to 2, $y$ is within the range from 0 to 1, M represents a cation selected from the group consisting of alkali metals, alkaline earth metals, ammonium and bismuth and the sum of $m+n$ is from 2 to 4, and R represents the residue of the hydroxy aliphatic carboxylic acid and has at least one hydroxy group and at least one carboxylic acid group for each one to six carbon atoms in a weight ratio $Al(OH)_3$:aluminum chelate within the range from about 1:4 to about 5:1, and drying the slurry to form a codried antacid composition.

16. A process in accordance with claim 15 wherein the slurry is prepared using an aqueous solution of the aluminum chelate.

17. A process in accordance with claim 15 wherein the pH of the slurry is adjusted to within the range from about 4 to about 9 prior to drying.

18. A process in accordance with claim 15 wherein the slurry is prepared from an aqueous solution of the chelate and a moist gelatinous aluminum hydroxide.

19. A process in accordance with claim 15 wherein the slurry is prepared from a dried aluminum chelate and a moist gelatinuous aluminum hydroxide.

20. A process in accordance with claim 15 wherein the slurry is prepared by mixing the organic acid, the hydrous gelatinuous aluminum hydroxide, and water, the aluminum hydroxide being present in an amount in excess of that required to form the aluminum chelate, and a basic compound selected from the group consisting of the oxides, hydroxides and basic salts of cations selected from the group consisting af alkali metals, alkaline earth metals, ammonium and bismuth, whereby the aluminum chelate is formed in situ and the codried antacid composition is formed in a one step operation.

References Cited

UNITED STATES PATENTS

| | | | |
|---|---|---|---|
| 2,446,981 | 8/1948 | Ninger | 424—317 |
| 3,401,223 | 9/1968 | Tanabe | 424—317 |

ALBERT T. MEYERS, Primary Examiner

DORIS J. FUNDERBURK, Assistant Examiner

U.S. Cl. X.R.

424—296, 317; 260—449